(12) United States Patent
Sauerwald et al.

(10) Patent No.: US 9,401,898 B2
(45) Date of Patent: Jul. 26, 2016

(54) SYSTEM AND METHOD FOR WIRELESS DATA PROTECTION

(71) Applicant: Apple Inc., Cupertino, CA (US)

(72) Inventors: Conrad Sauerwald, Mountain View, CA (US); Vrajesh Rajesh Bhavsar, Sunnyvale, CA (US); Kenneth Buffalo McNeil, San Jose, CA (US); Thomas Brogan Duffy, San Francisco, CA (US); Michael Lambertus Hubertus Brouwer, San Jose, CA (US); Matthew John Byom, San Jose, CA (US); Mitchell David Adler, Cupertino, CA (US); Eric Brandon Tamura, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/874,360

(22) Filed: Oct. 2, 2015

(65) Prior Publication Data

US 2016/0036791 A1    Feb. 4, 2016

Related U.S. Application Data

(62) Division of application No. 13/204,171, filed on Aug. 5, 2011, now abandoned.

(51) Int. Cl.
| | | |
|---|---|---|
| *H04L 9/00* | (2006.01) | |
| *H04L 29/06* | (2006.01) | |
| *H04L 9/08* | (2006.01) | |
| *G06F 11/14* | (2006.01) | |

(Continued)

(52) U.S. Cl.
CPC ........ *H04L 63/0435* (2013.01); *G06F 11/1464* (2013.01); *H04L 9/0822* (2013.01); *H04L 9/0825* (2013.01); *H04L 9/0863* (2013.01); *H04L 9/0894* (2013.01); *H04L 63/061* (2013.01); *H04W 12/04* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 5,870,477 A | 2/1999 | Sasaki et al. | ............... 713/165 |
| 5,982,891 A | 11/1999 | Ginter et al. | |
| 6,134,660 A | 10/2000 | Boneh et al. | |

(Continued)

FOREIGN PATENT DOCUMENTS

| | | |
|---|---|---|
| JP | 2006-526851 A | 11/2006 |
| JP | 2008-042718 A | 2/2008 |

(Continued)

*Primary Examiner* — Michael R Vaughan
(74) *Attorney, Agent, or Firm* — Blakely, Sokoloff, Taylor & Zafman LLP

(57) ABSTRACT

Disclosed herein are systems, methods, and non-transitory computer-readable storage media for wireless data protection utilizing cryptographic key management on a primary device and a backup device. A system encrypts a file with a file key and encrypts the file key twice, resulting in two encrypted file keys. The system encrypts each file key differently and stores a first file key on the primary device and transmits one of the encrypted file keys in addition to the encrypted file to a backup device for storage. On the backup device, the system associates the encrypted file key with a set of backup keys protected by a user password. In one embodiment, the system generates an initialization vector for use in cryptographic operations based on a file key. In another embodiment, the system manages cryptographic keys on a backup device during a user password change.

27 Claims, 16 Drawing Sheets

(51) Int. Cl.
*H04W 12/04* (2009.01)
*H04W 12/08* (2009.01)

(56) References Cited

U.S. PATENT DOCUMENTS

| | | | |
|---|---|---|---|
| 6,389,535 B1 | 5/2002 | Thomlinson et al. | |
| 7,240,219 B2 | 7/2007 | Teicher et al. | 713/193 |
| 8,412,934 B2 | 4/2013 | De Atley et al. | 713/165 |
| 8,433,901 B2 | 4/2013 | De Atley et al. | 713/165 |
| 8,510,552 B2 | 8/2013 | De Atley et al. | 713/165 |
| 8,589,680 B2 | 11/2013 | De Atley et al. | 713/165 |
| 2004/0091114 A1 | 5/2004 | Carter et al. | 380/259 |
| 2004/0236958 A1 | 11/2004 | Teicher et al. | |
| 2007/0100913 A1 | 5/2007 | Sumner et al. | 707/204 |
| 2008/0040613 A1 | 2/2008 | Challener | |
| 2008/0063209 A1 | 3/2008 | Jaquette et al. | 380/284 |
| 2009/0220087 A1 | 9/2009 | Brusilovsky et al. | |
| 2011/0055559 A1 | 3/2011 | Li et al. | |
| 2011/0252232 A1 | 10/2011 | De Atley et al. | 713/165 |
| 2011/0252233 A1 | 10/2011 | De Atley et al. | 713/165 |
| 2011/0252234 A1 | 10/2011 | De Atley et al. | 713/165 |
| 2011/0252243 A1 | 10/2011 | Brouwer et al. | 713/189 |

FOREIGN PATENT DOCUMENTS

| | | |
|---|---|---|
| JP | 2009-512077 A | 3/2009 |
| JP | 2010-539856 A | 12/2010 |
| WO | WO 2010/126638 A2 | 11/2010 |
| WO | WO 2010/126638 A3 | 11/2010 |
| WO | WO 2011/031439 A1 | 3/2011 |

CBC MODE ENCRYPTION

ECB MODE ENCRYPTION

SYSTEM AND METHOD FOR WIRELESS DATA PROTECTION

This is a Divisional of co-pending application Ser. No. 13/204,171 filed Aug. 5, 2011.

BACKGROUND

1. Technical Field

The present disclosure relates to wireless data protection and more specifically to protecting cryptographic keys relating to a backup between devices.

2. Introduction

Mobile communication devices, such as phones, PDAs, laptops, and so forth, are a critical aspect of the day-to-day operations for many users. Mobile devices enable communication in the form of email, text messaging, live chat, voice and video. These devices often store valuable information, such as personal data and confidential corporate data. The amount of information that such devices can store is increasing, as is the importance of the information stored. When a mobile device is lost or destroyed, all of the information stored within the device is also lost.

Some computing systems employ backup mechanisms such that in the event of loss or destruction of the computing system, at least some data is recoverable. The backup mechanism usually involves copying all or part of a file to a backup system for storage. Optionally, backup systems store incremental backups for a file previously backed up such that only data that has changed is sent to the backup system.

Mobile device backup mechanisms exist that regularly and automatically backup data stored on a mobile device. These mechanisms can backup data to other devices or computing systems such as phones, laptop computers, desktop computers and servers and are sufficient when data on a mobile device is accessible. However, when the data is inaccessible, such as when a mobile device is locked, the backup mechanism cannot backup the data because it does not have access to the user passcode to unlock the device. One method to overcome this weakness is for a backup mechanism to only perform backups when the device is unlocked. This method provides a means for backup, but cannot backup more recent data stored on the device since the last unlock event. Another solution is for a user to unlock a mobile device to perform a backup. However this method requires input from the user.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for protecting cryptographic keys during a backup between a primary device and a backup device. A primary device can be any computing device such as a personal computer, laptop, workstation on a network, server, cell phone, smart phone, personal digital assistant or other stationary or mobile devices capable of storing data. Likewise, a backup device can be any computing device such as a personal computer, laptop, workstation on a network, server, cell phone, personal digital assistant or other stationary or mobile devices capable of storing data. An exemplary system manages cryptographic keys on a primary device by encrypting a file with a file key, resulting in an encrypted file. The system encrypts the file key with a class encryption key, resulting in an encrypted file key. The class encryption key protects the file key according to the class of which the file is a member. After the system encrypts the file key with the class encryption key, the system encrypts the file key a second time, using a public key associated with a set of backup keys, resulting in a second encrypted file key. The system then transmits the encrypted file and the second encrypted file key to a backup device. The first encrypted file key is stored on the primary device.

An exemplary backup device manages cryptographic keys by receiving an encrypted file and an encrypted file key at a backup device from a primary device. The system associates the encrypted file key with a set of backup keys and encrypts the set of backup keys with a backup key set key, resulting in an encrypted set of backup keys. The backup device stores the encrypted file, the encrypted file key and the set of encrypted backup keys on the backup device for use in restoration.

In a backup restoration embodiment, an exemplary system can restore encrypted file data from a backup device to a primary device. When a primary device such as a phone or laptop is destroyed or lost, the system can restore the data lost with the device from the backup device to the primary device or to a new device. The approaches set forth herein can assume, when a device is destroyed or lost, that the passwords, keys, or other credentials associated with that device are compromised. The system transmits encrypted file data, an encrypted file key and a set of encrypted backup keys, from the backup device to the primary device. The system creates the set of encrypted backup keys by receiving an encrypted file and an encrypted file key at a backup device and associating the encrypted file key with a set of backup keys. Then the system encrypts the set of backup keys with a backup key set key, resulting in an encrypted set of backup keys.

During data restoration, at the primary device, the system receives encrypted file data, an encrypted file key and a set of encrypted backup keys from the backup device. The system decrypts the set of encrypted backup keys with a backup key set key resulting in a set of decrypted backup keys. Then the system decrypts the encrypted file key with a backup key, resulting in a decrypted file key. The encrypted file data is decrypted with the decrypted file key resulting in decrypted file data. Then the system stores the file data on the primary device.

In another embodiment, a system managing cryptographic keys can generate an initialization vector for use in a cryptographic operation. The system performs a cryptographic hash on a file encryption key and truncates the resulting hash to an encryption key size. The system then generates an intermediate result utilizing a linear feedback shift register with a block offset as the seed. The intermediate result is encrypted with the truncated hash of the file encryption key, resulting in an initialization vector. The initialization vector is utilized during encryption and decryption with a block cipher algorithm run in cipher block chaining mode. The initialization vector initializes the block cipher algorithm.

Additionally, the system can backup encryption keys during a password change performed by a user. The system assumes an old password has been compromised and generates an additional set of keys for protecting file keys. The system associates new file encryption keys generated when new files are created with the additional set of backup keys. Then the system encrypts the second set of backup keys with a new password received from the user. In this way, the system backs up encryption keys during a password change.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for wireless data protection. A system, method and non-transitory computer-readable media are disclosed which protect wireless data by managing cryptographic keys on a primary device and a backup device, restoring file data from a backup device to a primary device, and generating initialization vectors for use in cryptographic operations and protecting file keys during a password change. A brief introductory description of a basic general purpose system or computing device in FIG. 1 which can be employed to practice the concepts is disclosed herein. A more detailed description of wireless data protection will then follow. The disclosure now turns to FIG. 1.

Figure 1:
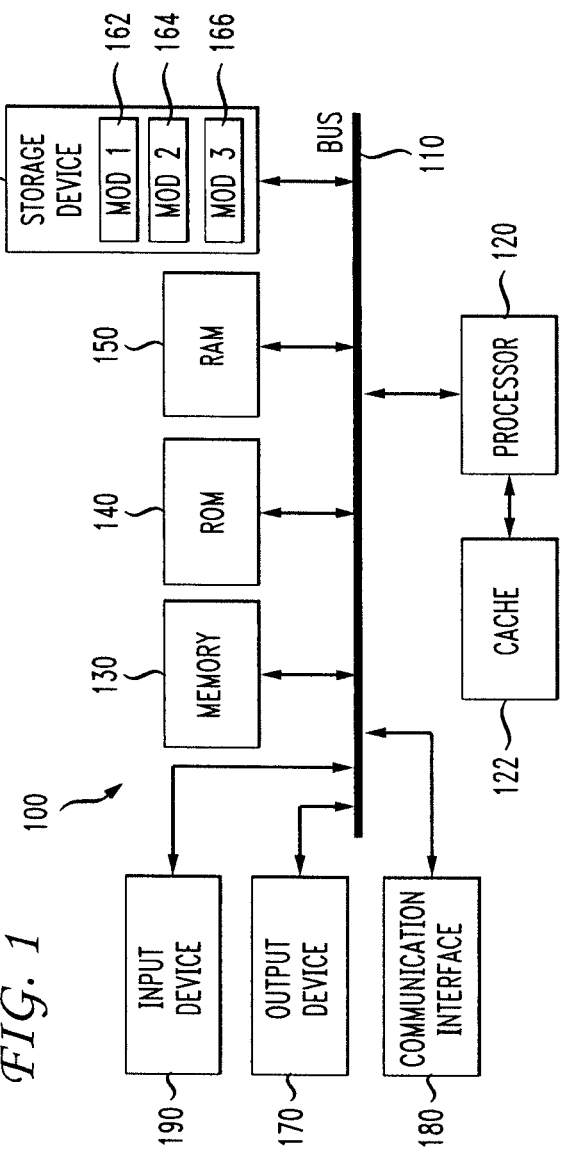
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit, and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Cryptography Discussion

Having disclosed some components of a computing system, the disclosure now turns to a brief discussion of cryptography. Cryptography encompasses both encryption and decryption and is used to hide information such that only the intended recipients of a message have access to the information. Encryption is the process of changing intelligible information in such a way that it appears unintelligible, and decryption is the reverse process, changing unintelligible information back into intelligible information. Encryption and decryption utilize a key that is kept secret to change the information between forms. Two different types of cryptography exist, the traditional symmetric key cryptography and asymmetric (or public-key) cryptography.

Figure 2:
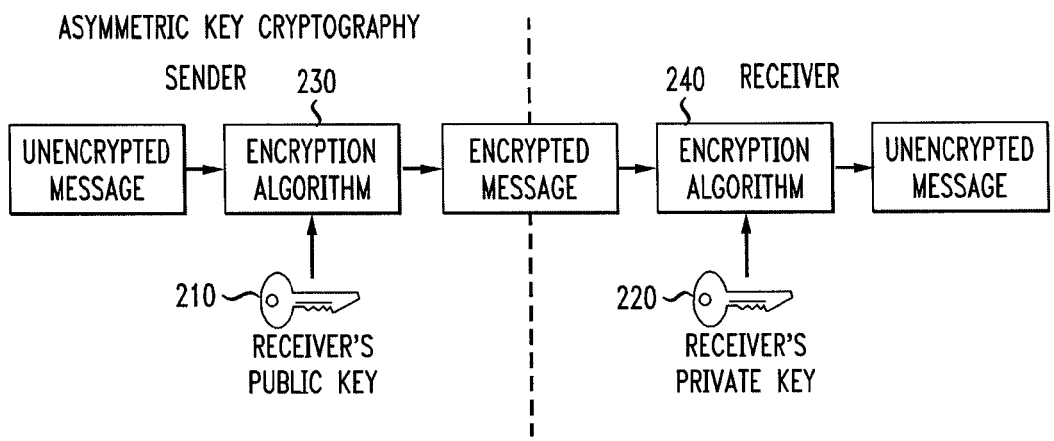
FIG. 2 illustrates asymmetric key cryptography.
Figure 3:
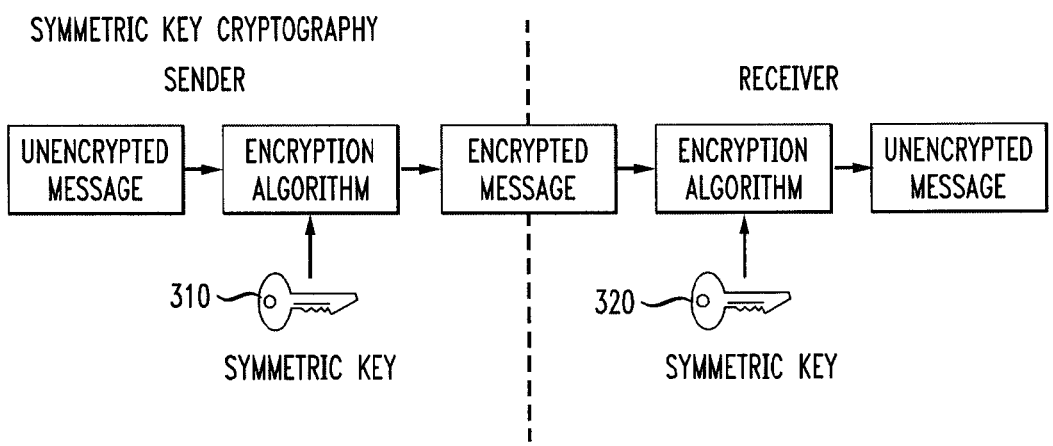
FIG. 3 illustrates symmetric key cryptography.

Public-key cryptography is a cryptographic approach that utilizes asymmetric key algorithms in addition to or in place of traditional symmetric key algorithms. FIG. 2 illustrates asymmetric key cryptography and FIG. 3 illustrates symmetric key cryptography. Asymmetric key algorithms differ from symmetric key algorithms in that different keys are used for encryption 210 and decryption 220. Symmetric key algorithms use the same key for encryption 310 and decryption 320 and are based on the notion of a shared secret key between the sender and the receiver of a message. Because public-key cryptography utilizes different keys for encryption and decryption, no secure exchange of a secret key between the sender and the receiver is needed. Advantages of traditional symmetric key cryptography include speed, because more modern asymmetric key algorithms are slower.

In public-key cryptography, a mathematically related key pair is generated, a private key and a public key. Although the keys are related, it is impractical to derive one key based on the other. The private key is kept secret and the public key is published. A sender encrypts a message with the receiver's public key 210 and an encryption algorithm 230, and the receiver of the message decrypts the message with the private key 220 and a corresponding encryption (or decryption) algorithm 240. Only the receiver's private key can decrypt the message encrypted with the receiver's public key. For example, Alice desires to send Bob a message containing personal information and encrypts the message to protect that information. Alice utilizes public key cryptography to send her message because she cannot securely share a cryptographic key with Bob. Alice encrypts the message to Bob with Bob's public key and sends the encrypted message to him. Bob receives the encrypted message and decrypts the message with the corresponding private key related to the asymmetric key pair. In this way, Alice sends Bob an encrypted message via public key cryptography without exchanging cryptographic keys.

Having discussed asymmetric and symmetric key cryptography, the disclosure now turns to a discussion of block ciphers. A block cipher is a cryptographic algorithm that encrypts data block-by-block, in contrast to a stream cipher which encrypts data bit-by-bit. The block cipher algorithm splits input data into blocks and operates on each block of data. Block ciphers can operate in different modes such as electronic code book (ECB) or cipher block chaining (CBC).

Figure 4:
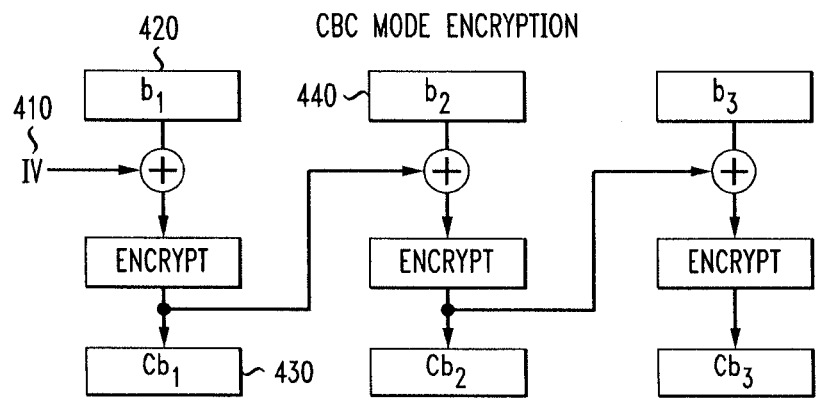
FIG. 4 illustrates cipher-block chaining (CBC) mode encryption.

In CBC mode, the output from one block of encryption is used as input to the next encryption operation. FIG. 4 illustrates a cipher run in CBC mode. An initialization vector (IV) 410 is combined with the first block of unencrypted bits $b_1$ 420 and the result is encrypted. An initialization vector randomizes unencrypted bits such that if the same block of plaintext is encrypted more than once with the same key, it does not appear as the same ciphertext. Encrypting the same block of plaintext more than once with the same key produces the same ciphertext. Using an IV 410 prevents this undesired effect from occurring. The IV 410 is used for the first block of data because no output from a previous round exists to combine with the first block of unencrypted bits. The encryption algorithm outputs a block of cipher bits $cb_1$ 430 and combines the cipher bits with the next block $b_2$ 440, which is then encrypted. The system repeats this process until all blocks of data have been encrypted. For decryption, the process is reversed. Each block of cipher bits is decrypted using the block cipher decryption algorithm, and then combined with the cipher bits of the previous block to produce plain (unencrypted) bits. For the first block, the cipher bits are decrypted and combined with the IV to produce unencrypted data.

Figure 5:
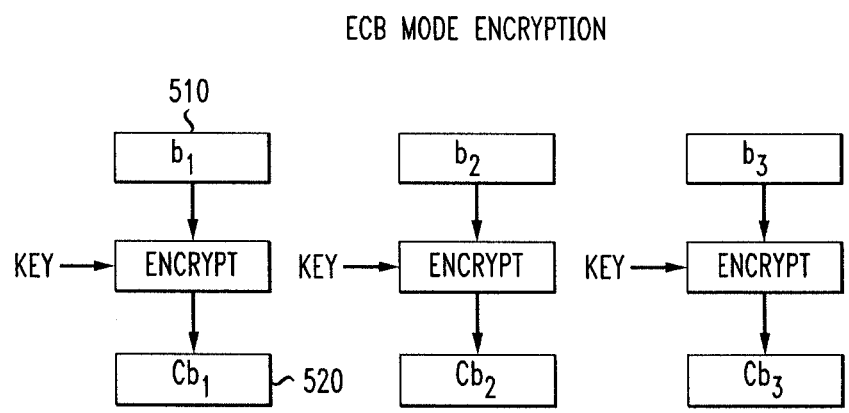
FIG. 5 illustrates electronic codebook (ECB) mode encryption.

FIG. 5 illustrates a cipher run in ECB mode. In ECB mode, the input data is split into blocks of data, which are then encrypted. Unlike CBC mode, there is no combination with output from previous rounds of encryption. The first block of unencrypted bits $b_1$ 510 is used as input to the encryption algorithm, and the algorithm outputs cipher bits $cb_1$ 520. One problem with ciphers run in ECB mode is that blocks of identical plain bits encrypt to blocks of identical cipher bits because the algorithm uses the same key to encrypt each block.

Figure 6:
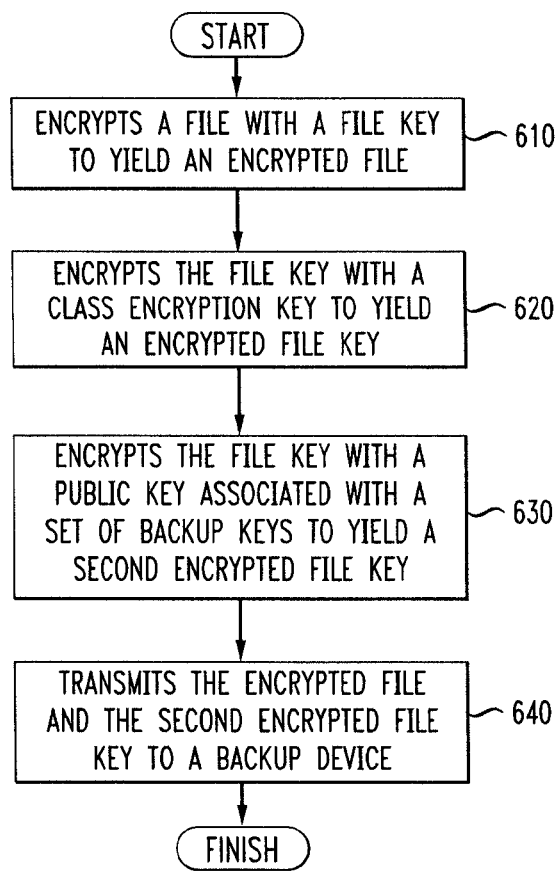
FIG. 6 illustrates an exemplary method embodiment for cryptographic key management on a primary device.

Having disclosed some system components and encryption concepts, the disclosure now turns to the exemplary method embodiment shown in FIG. 6. For the sake of clarity, each exemplary method herein is discussed in terms of an exemplary system 100 as shown in FIG. 1 configured to practice the respective method. The steps outlined herein are exemplary and can be implemented in any combination thereof, including combinations that exclude, add, or modify certain steps.

FIG. 6 illustrates wireless data protection by managing cryptographic keys on a primary device. A primary device can be any computing device such as a personal computer, laptop, workstation on a network, server, cell phone, personal digital assistant or other stationary or mobile devices capable of storing data. Backup of a primary device is necessary because devices are subject to accidental data deletion, loss, destruction and theft. In the event of data loss, the system can restore data to the same device, a new device of the same type, and/or a device of another type. Protecting the cryptographic keys during a backup event can ensure a secure system. A system practicing the method encrypts a file with a file key, resulting in an encrypted file (610). The file can contain text, images, video, speech, multimedia, etc. and can be in any format such as PNG, JPG, AVI, and HTML. The concept of a file key can be extended to cover data not stored in files, such as a memory segment or set of instructions, however the principles herein are discussed in terms of files. The file key is an encryption key and can be randomly generated. The file key can be a 256-bit AES key or a cryptographic key of any other length for use in any encryption algorithm such as AES, DES, Blowfish, etc. After the system encrypts the file with the file key, the system encrypts the file key with a class encryption key, resulting in an encrypted file key (620).

After the system encrypts the file key with a class encryption key, the system encrypts the file key with a public key associated with a set of backup keys resulting in a second encrypted file key (630). The public key can belong to an asymmetric key pair, and the respective private key is stored on a backup device. Then, the system transmits the encrypted file and the second encrypted file key to a backup device (640). A backup device can be any computing device such as a personal computer, laptop, workstation on a network, server, cell phone, smartphone, personal digital assistant or other stationary or mobile devices capable of storing data. The backup device can store one or more sets of backup keys for any number of devices. For example, a backup server can store five sets of backup keys for a cell phone and two sets of backup keys for a PDA.

Figure 7:
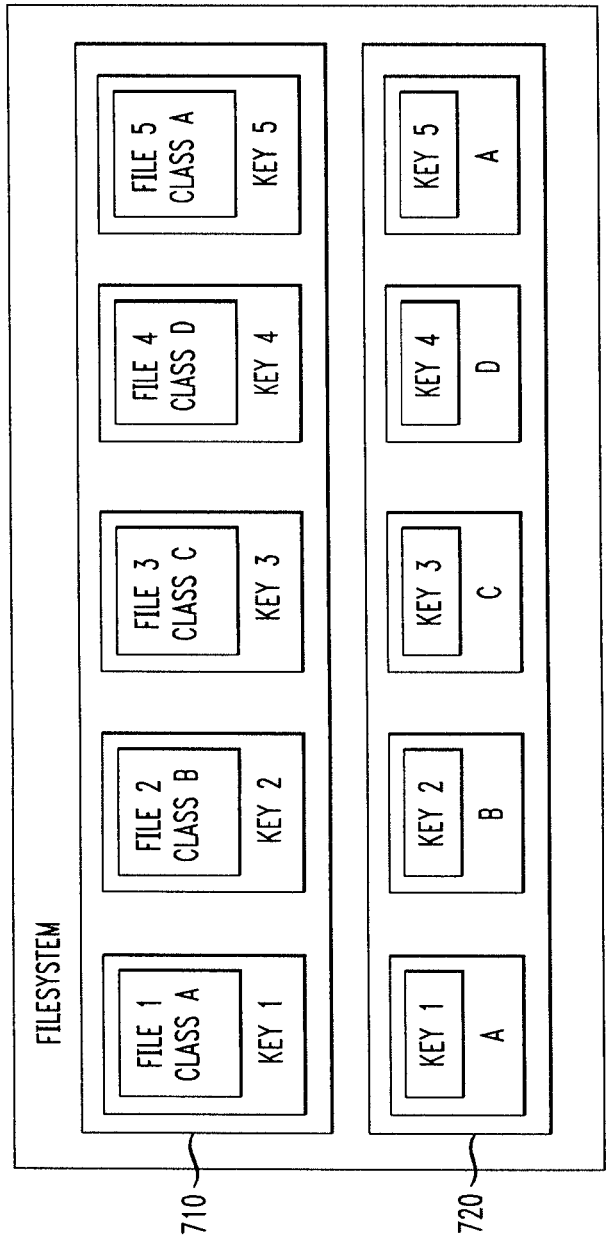
FIG. 7 illustrates example file key protection utilizing classes.

The class encryption key is a cryptographic key used to encrypt keys of a particular protection class. FIG. 7 illustrates a filesystem that protects file keys according to protection class. The system assigns each respective file to one of a set of protection classes 710, and assigns each protection class a class encryption key. In one aspect, each class encryption key is unique. The system encrypts each file encryption key with the corresponding class encryption key 720. For example, File 1 and File 5 are part of protection Class A, but have unique file encryption keys. File 1 is encrypted with Key 1, while File 5 is encrypted with key 5. Both key 1 and 5 are encrypted with key A. The protection classes allow certain file behavior and access rights. For example, files labeled readable while locked can be protected by a class encryption key, files labeled readable after first unlock can be protected by a different class encryption key and all files created by a particular user can be encrypted by a different class encryption key. Other file labels include writable while locked and readable while unlocked. Files can be classified or labeled in different ways for different security purposes. For instance, the classification system can be used to label files requiring different security. For example, class A files can be files that require the highest level of security and the class encryption key that protects the file keys for class A files can be a particularly strong encryption key, whereas class B files can be files that require a moderate level of security. The class encryption key that protects the file keys for class B files can be a moderately strong encryption key. This tiered approach to file or credential access through protection classes allows the system to protect files differently depending on the desired level of security.

Figure 8:
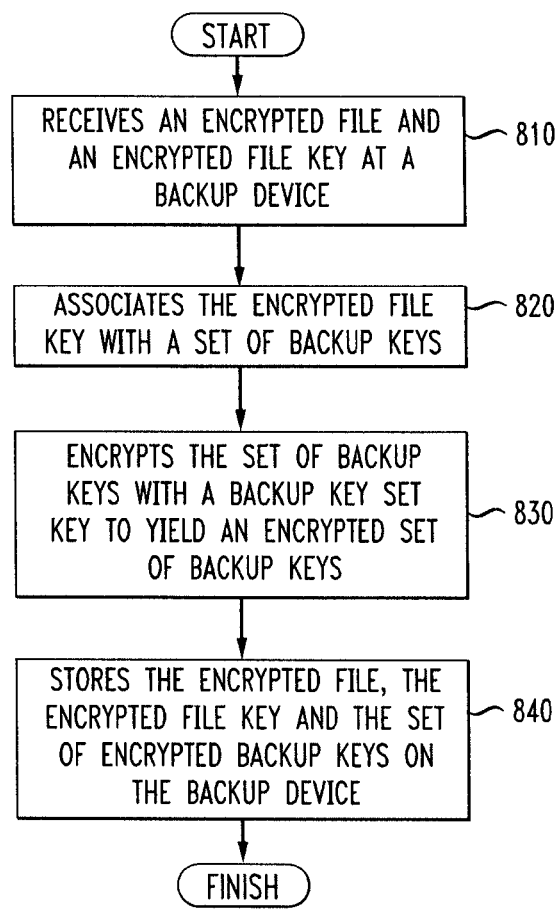
FIG. 8 illustrates an exemplary method embodiment for cryptographic key management on a backup device.

FIG. 8 illustrates an exemplary method embodiment for wireless data protection on a backup device. The system manages cryptographic keys on a backup device by receiving an encrypted file and an encrypted file key at a backup device from a primary device (810). The system associates the encrypted file key with a set of backup keys (820) and encrypts the set of backup keys with a backup key set key, resulting in an encrypted set of backup keys (830). The backup device stores the encrypted file, the encrypted file key and the set of encrypted backup keys on the backup device (840). The backup device stores the same encrypted file data as the primary device. However the file key used to encrypt file data is encrypted differently. The file key stored on the primary device is encrypted with a class encryption key, whereas the file key stored on the backup device is encrypted with a public key related to an asymmetric key pair.

Figure 9:
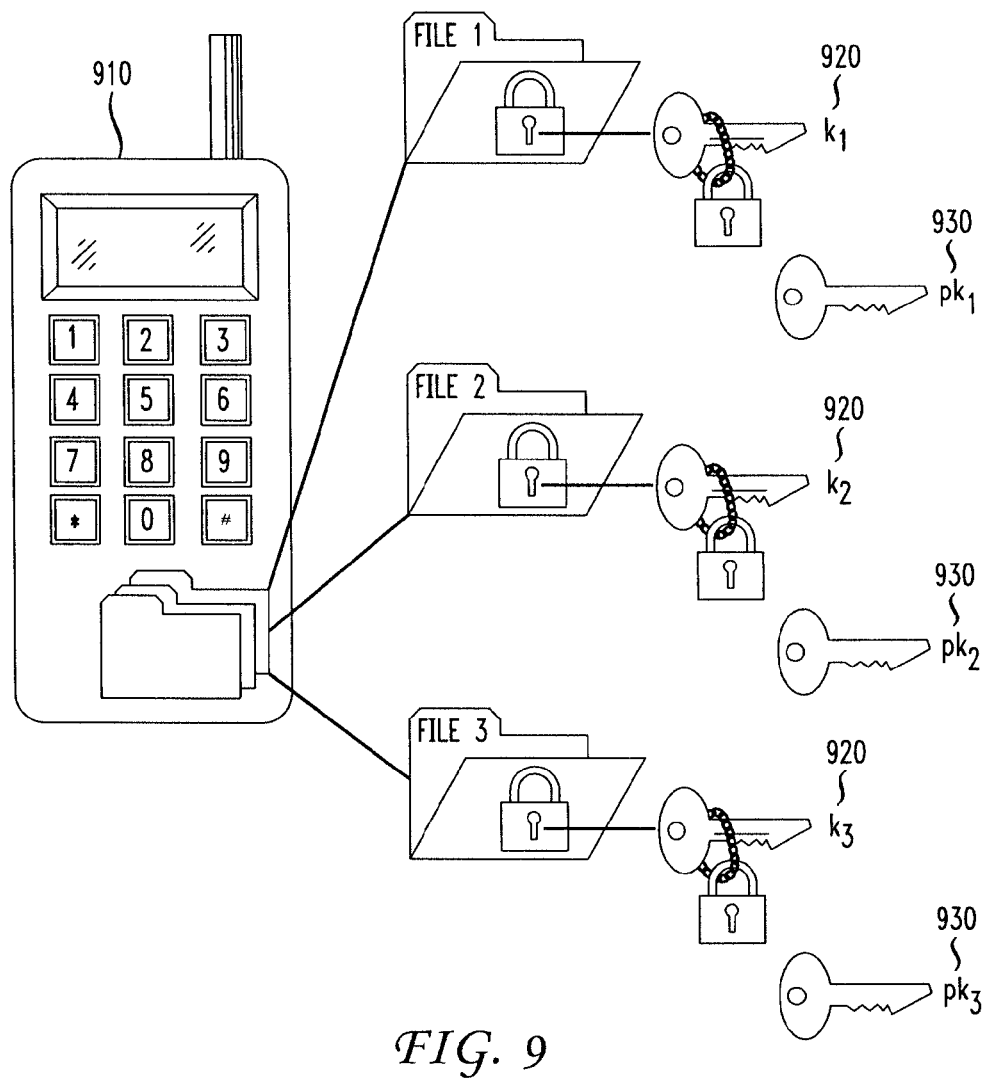
FIG. 9 illustrates exemplary cryptographic key management on a primary device.

FIG. 9 illustrates wireless data protection utilizing cryptographic key management on a primary device. The system stores file 1, file 2 and file 3 on a primary device, in this example, a cell phone 910. Each of the files is encrypted with a separate corresponding file encryption key, $k_1$, $k_2$ and $k_3$ 920. Each of the file encryption keys $k_1$, $k_2$ and $k_3$ are encrypted with a respective public key, $pk_1$, $pk_2$ and $pk_3$ 930 associated with a backup key set. The primary device 910 transmits the encrypted file data for each of the file 1, file 2 and file 3, and each of the respective encrypted file keys $k_1$, $k_2$ and $k_3$ to the backup device, in this example, a desktop computer. The public keys can be a mirror of the class keys in the system keybag on the device.

Figure 10:
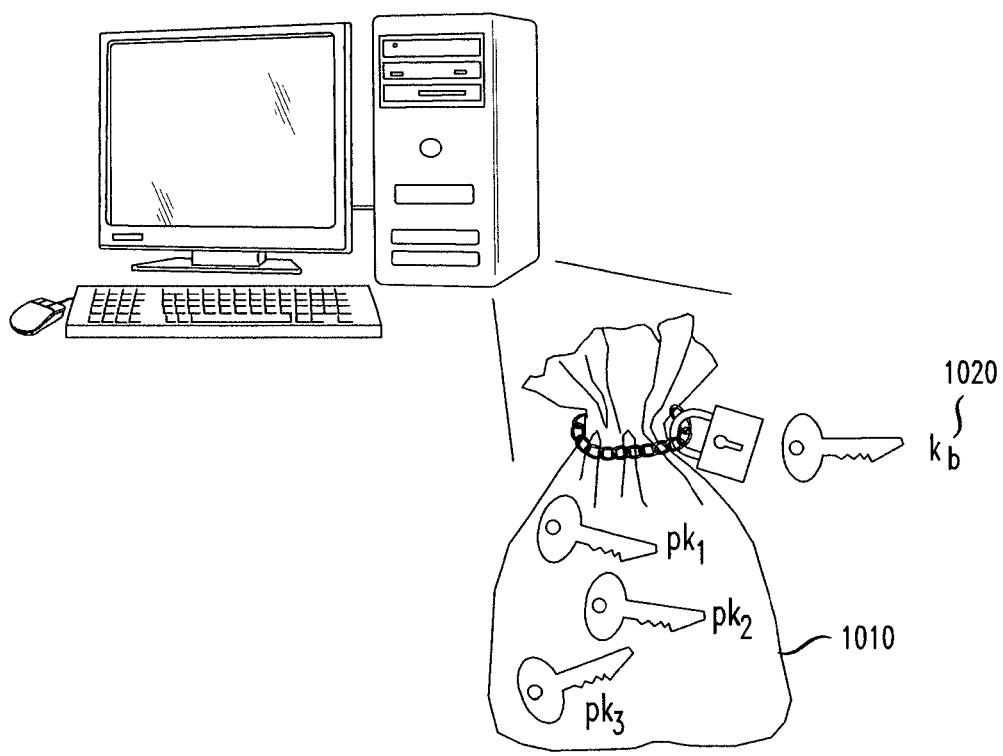
FIG. 10 illustrates exemplary cryptographic key management on a backup device.
Figure 11:
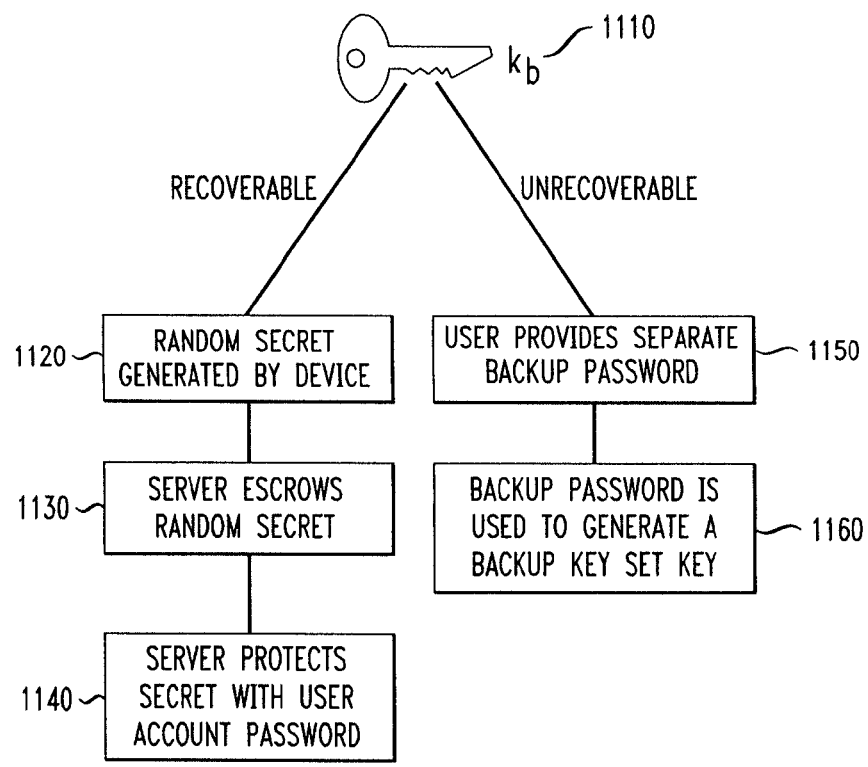
FIG. 11 illustrates a block diagram of backup key set key protection.

FIG. 10 illustrates wireless data protection on a backup device. The system stores the corresponding private keys in one or more sets of backup keys 1010 on the backup device. For example, the system stores the set of backup keys 1010 on a desktop computer for safe-keeping. The system then encrypts the set of backup keys 1010 with a backup key set key $k_b$ 1020. FIG. 11 illustrates an exemplary block diagram for backup key set key protection. The system can receive a randomly generated secret from a primary device 1120, the backup key set key $k_b$ 1110, which the backup device escrows 1130. Key escrow is the process of providing a cryptographic key to a third party for safe-keeping. The backup device protects the backup key set key with a user password 1140. The user password can be the same as a user account password already in use in the system. In this case, if a user forgets their password, a service provider can reset the user password without updating the encrypted set of keys. A service provider can protect the backup key set key with the new user password so the user can access the set of backup keys by providing the new user password. Additionally, a backup device can encrypt the backup key set key in any way because it is escrowing the key. Optionally, the user can choose to protect the set of backup keys such that the backup key set key is unrecoverable by a service provider. The user can provide a separate backup password 1150 that is used to generate the backup key set key 1160. In this case, if a user forgets their password, the service provider cannot recover the backup key set key.

Some implementations offer two levels of protection for the backup key-bag on the server. For example, the device can generate a random backup key-bag secret and escrow that backup key-bag secret with the server. The server protects this secret with the user's regular account password, but it is not encrypted with that password. The server can encrypt the secret in any manner it chooses as part of escrowing the secret. Because the account password is recoverable, the backup key-bag secret is also recoverable. A separate random backup key-bag secret allows the account password to change without the need to update the encrypted key-bag.

In another example, the user can specify a separate backup password. The device generates a backup key-bag secret based on that password, but does not escrow that secret with the server. The user re-enters this separate backup password when restoring, and there is no way to recover this password, resulting in an unrecoverable password.

Figure 12:
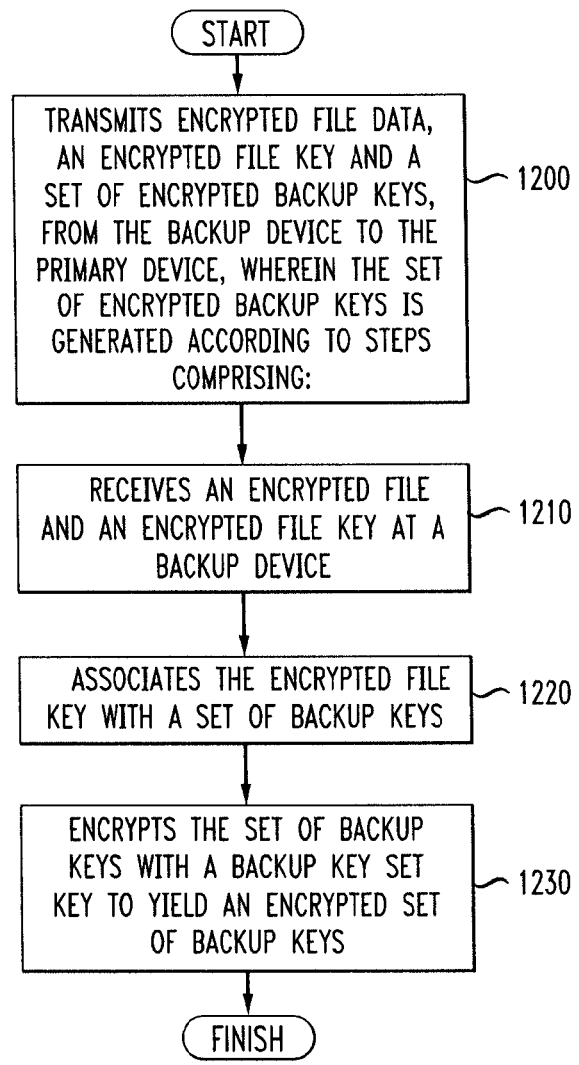
FIG. 12 illustrates an exemplary method embodiment for restoring backup data on a backup device.

FIG. 12 illustrates an exemplary method embodiment for restoring encrypted file data from a backup device to a primary device. A primary device can be the same device from which the backup was performed or a different device. For example, if a user accidentally deletes data from their phone, the user can restore the lost data up to the point of the last backup of the phone. Alternately, if a user's phone is stolen, a user can purchase a new phone and restore the lost data up to the point of the last backup from the user's original device on the new phone. A system practicing the method transmits encrypted file data, an encrypted file key and a set of encrypted backup keys, from the backup device to the primary device (1200). The set of encrypted backup keys are generated by the system or by another device or collection of devices which receive an encrypted file and an encrypted file key at a backup device (1210), associate the encrypted file key with a set of backup keys (1220) and encrypt the set of backup keys with a backup key set key, resulting in an encrypted set of backup keys (1230).

Figure 13:
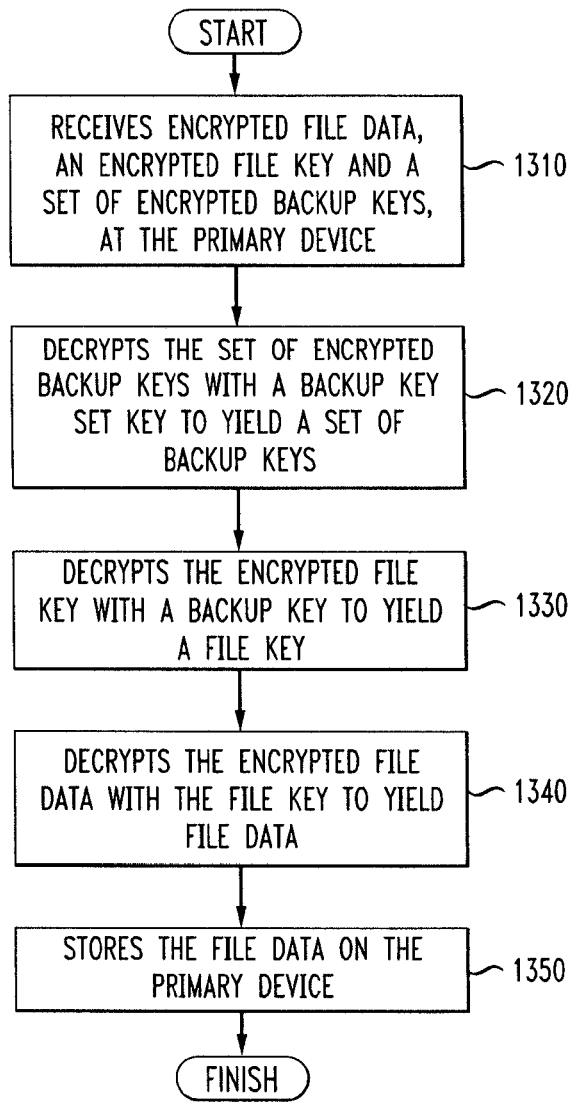
FIG. 13 illustrates an exemplary method embodiment for restoring backup data on a primary device.

FIG. 13 illustrates an exemplary method embodiment for restoring encrypted file data on a primary device. A system practicing the method receives encrypted file data, an encrypted file key and a set of encrypted backup keys, at the primary device (1310). The system decrypts the set of encrypted backup keys with a backup key set key, resulting in a set of backup keys (1320). Once the set of backup keys is decrypted, the system decrypts the encrypted file key with a backup key from the set of backup keys, resulting in a file key (1330). The file key is used to decrypt the encrypted file data to yield file data (1340) and the system stores the decrypted file data on the primary device (1350).

Initialization Vector Generation

Figure 14:
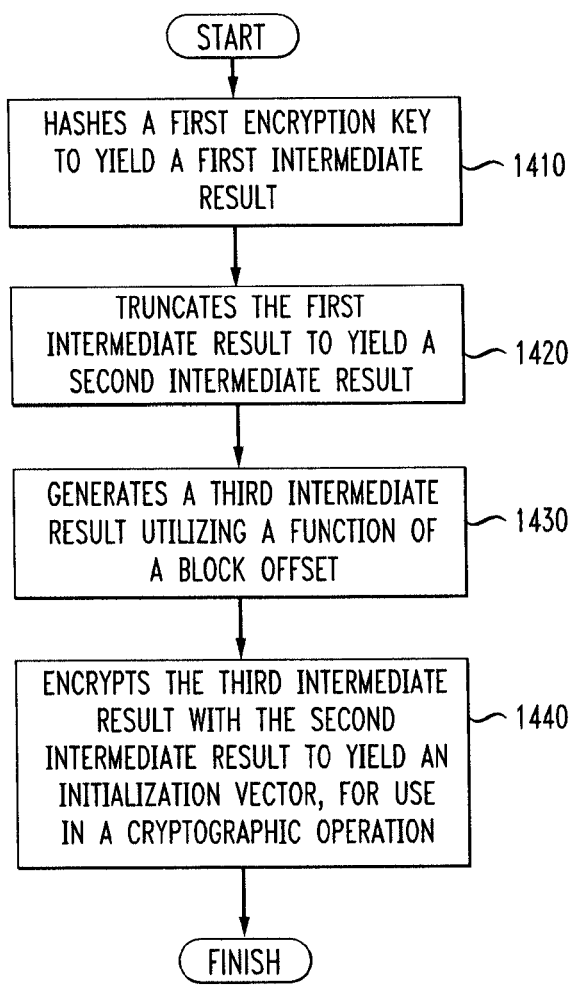
FIG. 14 illustrates an exemplary method embodiment for generating an initialization vector.

The system can generate an initialization vector for use in cryptographic operations. An initialization vector (IV) is used during the CBC mode of encryption to add variation to the data. FIG. 14 illustrates an exemplary method embodiment for generating an initialization vector. The system performs a cryptographic hash of a first encryption key, the file key, to produce a first intermediate result (1410). The file key is an encryption key and can be randomly generated. The file key can be a 256-bit AES key or a cryptographic key of any other length for use in any encryption algorithm such as AES, DES, Blowfish, etc. Next, the system truncates the first intermediate result to produce a second intermediate result (1420) and generates a third intermediate result utilizing a function of a block offset (1430). The system truncates the first intermediate result, a hash of the file encryption key, to an encryption key size appropriate for a particular cryptographic algorithm such as 16 bytes, or any other size. A function of a block offset can be a linear feedback shift register (LFSR) or any other function utilizing the block offset. The block offset is an index into the data, indicating a block number. Lastly, the system encrypts the third intermediate result with the second intermediate result to yield an IV for use in encryption and decryption (1440). The encryption algorithm used to encrypt the third intermediate result with the second intermediate result can be any encryption algorithm such as DES or other suitable symmetric encryption algorithm.

Figure 15:
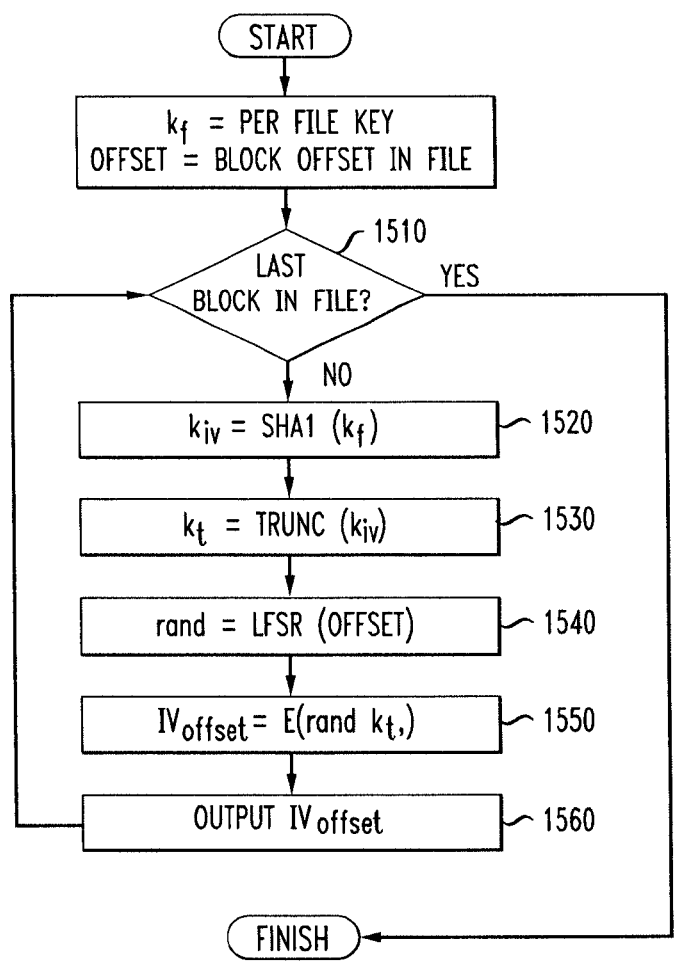
FIG. 15 illustrates an exemplary logic flow for generating an initialization vector.

FIG. 15 illustrates an example logical flow for an iterative approach for generating an IV for use in cryptographic operations. When encrypting file data, the system generates an IV for each block of data in the file. For instance, for a file with size 2 MB, the system can split the file into 500 blocks of size 4 KB. For each of the 500 blocks, the system generates an IV for use in encryption and decryption. First, the system checks if the current block is the last block in the file 1510. If the current block is the last block, then the system exits the IV generation routine. If it is not the last block, the system continues with the IV generation routine. The system generates the 20-byte $k_{iv}$ by performing a hash utilizing the SHA-1 encryption algorithm and the per file key, $k_f$, as input 1520. The intermediate result $k_{iv}$ is truncated to 16 bytes to produce the intermediate result $k_t$ 1530. The truncation size is an encryption key size and can be any size required by a specific encryption algorithm such 8, 12 or 16 bytes or any number of bytes. At this point, the block offset into the file is used as input to a LFSR to produce a pseudorandom value rand 1540.

A LFSR is a shift register whose feedback bit is a linear combination of preceding bits. A shift register is a function that operates on data bit by bit, outputting one bit at a time. After the function outputs a bit, all of the bits are shifted one location in the register and a new bit is computed based on the preceding bits. The process repeats until the desired number of bits is output from the function. The register has a finite number of states, and eventually enters a repeating cycle of output bits. Because of the repeating nature of LFSRs, they are not truly random. Software and/or hardware LFSRs can generate the pseudo-random numbers.

The variable rand is generated by applying a LFSR to the block offset 1540. After the system generates rand, the system encrypts the output from the LFSR, rand 1550 with the intermediate result $k_t$, and outputs the IV for the current block 1560. The system returns to checking if the current block is the last block in the file 1510. If it is the last block, the system exits after generating all the necessary IVs. If not, the system continues generating IVs for the remaining data blocks in the file.

The file key is used to generate the IV in such a way that if an attacker gains access to the IV, he cannot gain access to the file key. One of the benefits of computing an IV in the disclosed manner is that the IV is not tied to the device it is stored on. Alternate methods of generating an IV exist that tie the IV to the device it was generated on. These methods are sufficient when data is restored to the original device, however they are not sufficient when backed up data is restored to a new device as is the case when a device is stolen or destroyed. The disclosed methods provide for data restoration to a different device.

Changing a User Password with a Backup Process Enabled

Figure 16:
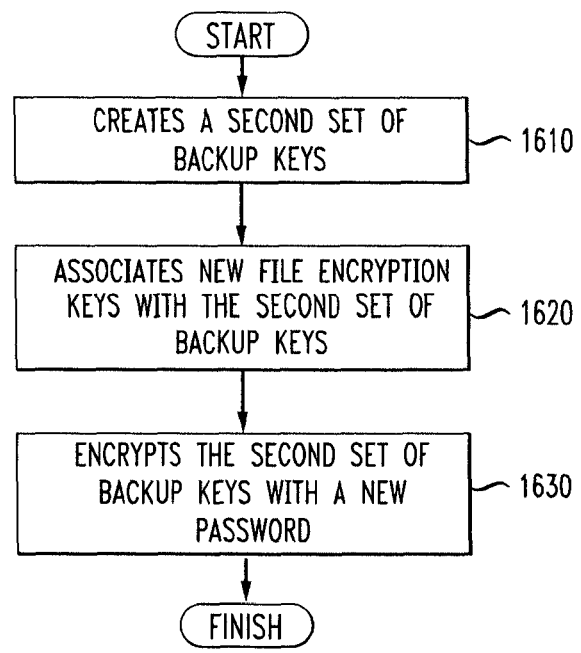
FIG. 16 illustrates an exemplary method embodiment for backup key management during a password change.

FIG. 16 illustrates an exemplary method embodiment for changing a user password. When a user changes his password, the system can assume that the old password has been compromised and is no longer trusted to protect a set of backup keys. The change of passwords can be a mandatory event, such as when a device is lost or destroyed, or can be a voluntary, user-initiated event. When the user changes his password and a backup process is enabled, the system creates a second set of backup keys (1610) on the backup device. The system associates new file encryption keys with the second set of backup keys on the backup device (1620). The system generates new file encryption keys when a new file is created. After the user password change, any new file keys generated for newly created files are associated with the second set of backup keys. The system encrypts the second set of backup keys ultimately with the new user password (1630). The system can generate a random secret and protects the random secret with the new user password. A backup system can contain any number of sets of backup keys. The backup key-bag secret can be derived from the password case instead of being randomly generated. The file keys can be stored in the key-sets, encrypted by the keys in the key-sets, and stored in the file metadata.

Figure 17:
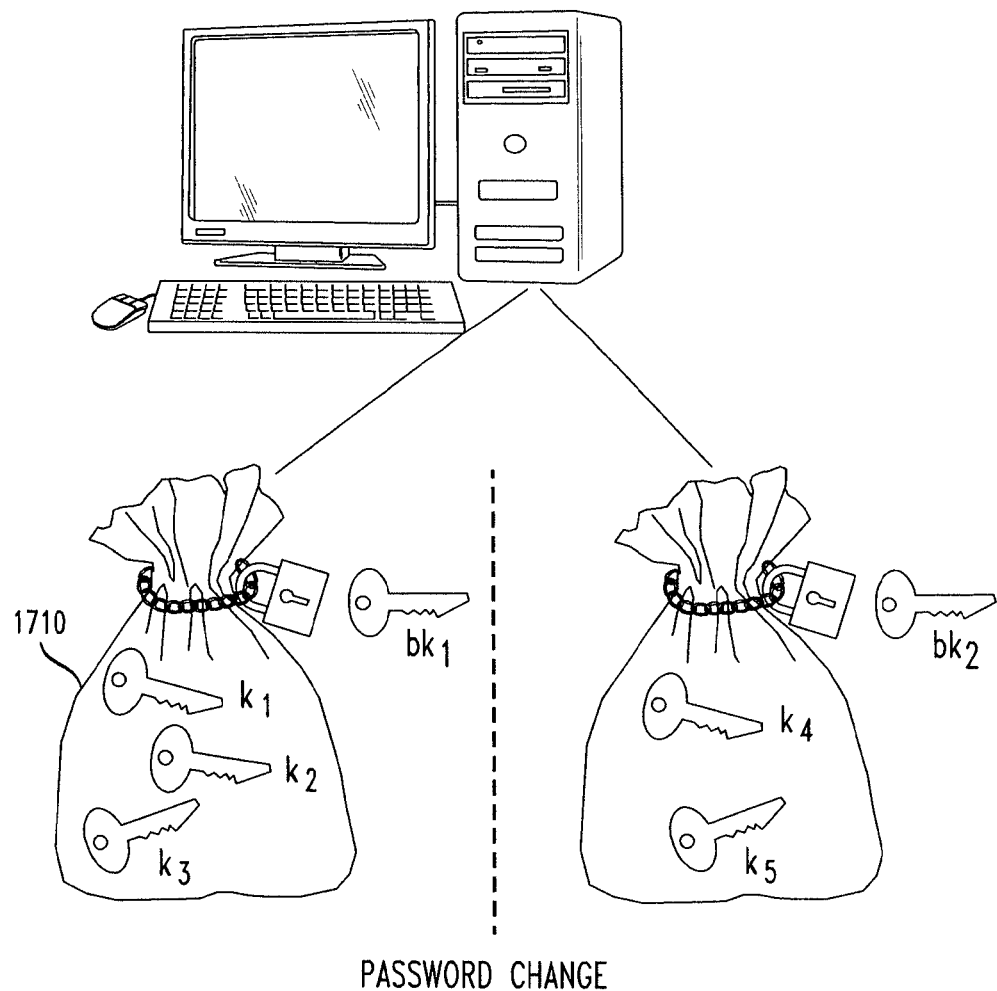
FIG. 17 illustrates an example architecture for backup key management during a password change.

FIG. 17 illustrates an exemplary architecture for changing a user password. Prior to a password change, the backup set of keys 1710 is protected by a key $bk_1$ derived from a user password. The set of backup keys protected in the first set of keys is $k_1$, $k_2$ and $k_3$. These keys encrypt the file keys for file 1, file 2 and file 3, respectively that are stored on a primary device, such as a cell phone. After the password change, the system creates a new set of backup keys on the backup device and stores newly created backup keys in the new set. For example, the system creates file 4 and file 5 and stores the newly generated encryption keys $k_4$ and $k_5$ that protect the file keys in the new set of backup keys. The file keys for file 4 and file 5 are encrypted by the encryption keys $k_4$ and $k_5$ respectively and stored in the corresponding file metadata. The system derives a new backup key set key $bk_2$ 1720 from the new password to protect the new set of backup keys. The system can generate any number of backup key sets for any number of password changes. Each time a user changes his password, the system creates an additional backup key set on the backup device and protects the new set with a key derived from the new user password. In this way, the system protects the set of backup keys stored on another device during a password change.

In one embodiment, raw access of encrypted data is enabled by bypassing the buffer cache. A cache stores data such that requests for data can be accomplished faster than fetching data from disk each time it is needed. The buffer cache is bypassed so that the system can access encrypted data from the disk without decrypting the data. When accessing the filesystem in a normal manner, the filesystem access layer can automatically decrypt the data.

Figure 18:
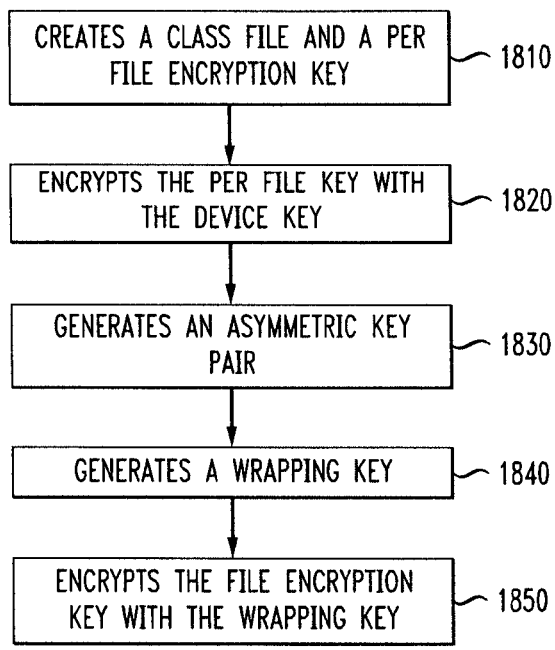
FIG. 18 illustrates an exemplary backup key generation process.

In another embodiment, an efficient method of generating a backup key based on a per file key stored on a backup device is disclosed. FIG. 18 illustrates the backup key generation process. For example, a system can unlock a primary device and create a new class A file and a random per file encryption key (1810). The system can encrypt the per file key with the device key (1820). The system can generate an ephemeral public/private key pair (1830), which can be used more than once in a single session instead of generating a new public/private key pair for each file. The system can generate a wrapping key to protect the per file key for the backup device (1840) using a key exchange between an ephemeral key and the backup keyset key. Finally, the system encrypts the per file encryption key with the wrapping key (1850) for storage on the backup device. For the duration of time the device is unlocked, the wrapping key and the ephemeral public/private key pair can be reused. This process avoids the expensive generation and key exchange to get a new ephemeral key pair and wrapping key for each file. The disclosed method applies to file keys in the same class, in the provided example class A, for the duration of time the device is unlocked without the loss of security.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply not only to backing up mobile devices, but to other devices or computing systems that perform cryptographic operations. Those skilled in the art will readily recognize various modifications and changes that may be made to the principles described herein without following the example embodiments and applications illustrated and described herein, and without departing from the spirit and scope of the disclosure.

We claim:

1. A method comprising:
generating, by a processor on a primary device, an initialization vector for a cryptographic operation, the generating comprising:
performing a hash of a file key to yield a first intermediate result;
truncating the first intermediate result to yield a second intermediate result;
generating a third intermediate result utilizing a function of a block offset; and
encrypting the third intermediate result with the second intermediate result to yield the initialization vector;
encrypting, by the processor, a file using the initialization vector to yield an encrypted file that is stored on the primary device, the file being associated with a protection class defining an access level for the file;
encrypting, by the processor, the file key using a class encryption key to yield an encrypted file key that is stored on the primary device, the class encryption key selected based on the protection class for the file;
encrypting, by the processor, the file key using a public key associated with a set of backup keys to yield a second encrypted file key, the set of back keys comprising a private key corresponding to the public key; and
transmitting the encrypted file and the second encrypted file key to a backup device.

2. The method of claim 1, wherein the SHA-1 encryption algorithm is used to perform a hash of the file key.

3. The method of claim 1, wherein the first intermediate result is truncated to an encryption key size.

4. The method of claim 1, wherein the function of a block offset is a linear feedback shift register.

5. The method of claim 4, wherein the block offset is a seed for the linear feedback shift register.

6. The method of claim 1, wherein generating an initialization vector is performed for each block of data of the file.

7. The method of claim 1, wherein the initialization vector is used to separately encrypt each block of data of the file.

8. The method of claim 1, wherein the class encryption key is associated with a set of files, wherein the set of files has at least one similar attribute.

9. The method of claim 1 further comprising:
receiving, by a processor on the backup device, the encrypted file and the encrypted file key from the primary device;
associating, by the processor on the backup device, the encrypted file key with the set of backup keys;
encrypting, by the processor on the backup device, the set of backup keys with a backup key set key to yield an encrypted set of backup keys; and
storing, by the processor on the backup device, the encrypted file, the encrypted file key and the encrypted set of backup keys on the backup device.

10. A non-transitory computer-readable storage medium storing executable instructions that cause a primary device to perform operations comprising:
generating, by a processor on the primary device, an initialization vector for a cryptographic operation, the generating comprising:
performing a hash of a file key to yield a first intermediate result;
truncating the first intermediate result to yield a second intermediate result;
generating a third intermediate result utilizing a function of a block offset; and
encrypting the third intermediate result with the second intermediate result to yield the initialization vector;
encrypting, by the processor, a file with the initialization vector to yield an encrypted file that is stored on the primary device, the file being associated with a protection class defining an access level for the file;
encrypting, by the processor, the file key with a class encryption key to yield a first encrypted file key that is stored on the primary device, the class encryption key selected based on the protection class for the file;
encrypting, by the processor, the file key with a public key associated with a set of backup keys to yield a second encrypted file key, wherein the set of backup keys comprises a private key corresponding to the public key; and
transmitting the encrypted file and the second encrypted file key to a backup device for storage.

11. The non-transitory computer-readable storage medium of claim 10, wherein the SHA-1 encryption algorithm is used to perform a hash of the file key.

12. The non-transitory computer-readable storage medium of claim 10, wherein the first intermediate result is truncated to an encryption key size.

13. The non-transitory computer-readable storage medium of claim 10, wherein the function of a block offset is a linear feedback shift register.

14. The non-transitory computer-readable storage medium of claim 13, wherein the block offset is a seed for the linear feedback shift register.

15. The non-transitory computer-readable storage medium of claim 10, wherein generating an initialization vector is performed for each block of data of the file.

16. The non-transitory computer-readable storage medium of claim 10, wherein the initialization vector is used to separately encrypt each block of data of the file.

17. The non-transitory computer-readable storage medium of claim 10, wherein the class encryption key is associated with a set of files, wherein the set of files has at least one similar attribute.

18. A non-transitory computer-readable storage medium of claim 10, wherein the executable instructions further cause a backup device to perform operations comprising:
receiving, by a processor on the backup device, the encrypted file and the encrypted file key from the primary device;
associating, by the processor on the backup device, the encrypted file key with the set of backup keys;

encrypting, by the processor on the backup device, the set of backup keys with a backup key set key to yield an encrypted set of backup keys; and storing, by the processor on the backup device, the encrypted file, the encrypted file key and the encrypted set of backup keys on the backup device.

19. A system comprising:

a processor on a primary device; and a memory on the primary device coupled to the processor on the primary device, the memory on the primary device storing executable instructions that cause the processor on the primary device to perform operations comprising:

generating an initialization vector for a cryptographic operation, the generating comprising:

performing a hash of a file key to yield a first intermediate result;

truncating the first intermediate result to yield a second intermediate result;

generating a third intermediate result utilizing a function of a block offset; and encrypting the third intermediate result with the second intermediate result to yield the initialization vector;

encrypting a file with the initialization vector to yield an encrypted file that is stored on the primary device, the file being associated with a protection class defining an access level for the file;

encrypting the file key with a class encryption key to yield a first encrypted file key that is stored on the primary device, the class encryption key selected based on the protection class for the file;

encrypting the file key with a public key associated with a set of backup keys to yield a second encrypted file key, wherein the set of backup keys comprises a private key corresponding to the public key; and transmitting the encrypted file and the second encrypted file key to a backup device for storage.

20. The system of claim 19, wherein the SHA-1 encryption algorithm is used to perform a hash of the file key.

21. The system of claim 19, wherein the first intermediate result is truncated to an encryption key size.

22. The system of claim 19, wherein the function of a block offset is a linear feedback shift register.

23. The system of claim 22, wherein the block offset is a seed for the linear feedback shift register.

24. The system of claim 19, wherein generating an initialization vector is performed for each block of data of the file.

25. The system of claim 19, wherein the initialization vector is used to separately encrypt each block of data of the file.

26. The system of claim 19, wherein the class encryption key is associated with a set of files, wherein the set of files has at least one similar attribute.

27. The system of claim 19 further comprising;

a processor on the backup device; and a memory on the backup device coupled to the processor on the backup device, the memory on the backup device storing executable instructions that cause the processor on the backup device to perform operations comprising:

receiving the encrypted file and the encrypted file key from the primary device;

associating the encrypted file key with the set of backup keys;

encrypting the set of backup keys with a backup key set key to yield an encrypted set of backup keys; and storing the encrypted file, the encrypted file key and the encrypted set of backup keys on the backup device.

* * * * *